United States Patent
Logan (10) Patent No.: US 10,837,277 B2
(45) Date of Patent: Nov. 17, 2020

(54) WELL COMPLETION SYSTEM AND METHOD

(71) Applicant: C&J ENERGY SERVICES, INC., Houston, TX (US)

(72) Inventor: William Dale Logan, Fulshear, TX (US)

(73) Assignee: NEXTIER COMPLETION SOLUTIONS INC., Houston, TX (US)

( * ) Notice: Subject to any disclaimer, the term of this patent is extended or adjusted under 35 U.S.C. 154(b) by 0 days.

(21) Appl. No.: 15/554,856

(22) PCT Filed: Jul. 17, 2015

(86) PCT No.: PCT/US2015/040919
§ 371 (c)(1),
(2) Date: Aug. 31, 2017

(87) PCT Pub. No.: WO2016/140699
PCT Pub. Date: Sep. 9, 2016

(65) Prior Publication Data
US 2018/0038226 A1     Feb. 8, 2018

Related U.S. Application Data

(60) Provisional application No. 62/127,199, filed on Mar. 2, 2015.

(51) Int. Cl.
*E21B 49/00* (2006.01)
*E21B 43/26* (2006.01)
(Continued)

(52) U.S. Cl.
CPC ............... *E21B 49/00* (2013.01); *E21B 7/04* (2013.01); *E21B 34/06* (2013.01); *E21B 43/11* (2013.01);
(Continued)

(58) Field of Classification Search
CPC .... E21B 2034/007; E21B 34/06; E21B 43/11; E21B 43/26; E21B 43/267; E21B 49/00;
(Continued)

(56) References Cited

U.S. PATENT DOCUMENTS 7,036,610 B1   5/2006  Vail, III
7,108,084 B2   9/2006  Vail, III
(Continued)

FOREIGN PATENT DOCUMENTS

| CN | 101305159 A | 11/2008 |
| WO | 2013/126074 A1 | 8/2013 |
| WO | 2014/092712 A1 | 9/2014 |

OTHER PUBLICATIONS

Ajisafe et al., "Engineered Completion Workflow Increases Reservoir Contact and Production in the Wolfcamp Shale, West Texas," © 2014 Society of Petroleum Engineers, pp. 1-11.
(Continued)

*Primary Examiner* — Christopher J Sebasta
(74) *Attorney, Agent, or Firm* — McGlinchey Stafford; R. Andrew Patty, II (57) ABSTRACT

A well completion system and related methods are disclosed. The methods utilize mapped geological formation characterization data based on mechanical specific energy (MSE) values to determine a well completion scenario and executes the well completion scenario.

19 Claims, 7 Drawing Sheets

(51) Int. Cl.

| | | |
|---|---|---|
| *G01V 1/40* | (2006.01) | |
| *E21B 43/11* | (2006.01) | |
| *E21B 7/04* | (2006.01) | |
| *E21B 34/06* | (2006.01) | |
| *E21B 43/267* | (2006.01) | |
| *G01V 1/30* | (2006.01) | |
| *G01V 1/50* | (2006.01) | |

(52) U.S. Cl.
CPC ............ *E21B 43/26* (2013.01); *E21B 43/267* (2013.01); *G01V 1/306* (2013.01); *G01V 1/40* (2013.01); *E21B 2200/06* (2020.05); *G01V 1/50* (2013.01)

(58) Field of Classification Search
CPC ....... E21B 7/04; E21B 2200/06; G01V 1/306; G01V 1/40; G01V 1/50
See application file for complete search history.

(56) References Cited

U.S. PATENT DOCUMENTS

| | | | |
|---|---|---|---|
| 7,181,380 B2 | 2/2007 | Dusterhoft et al. | |
| 7,325,617 B2 | 2/2008 | Murray | |
| 7,953,587 B2 | 5/2011 | Bratton et al. | |
| 9,228,425 B2 | 1/2016 | Ganguly et al. | |
| 2002/0096324 A1* | 7/2002 | Poe, Jr. .................. | E21B 43/00 166/250.15 |
| 2004/0122640 A1 | 6/2004 | Dusterhoft | |
| 2004/0220790 A1 | 11/2004 | Cullick et al. | |
| 2008/0105424 A1 | 5/2008 | Remmert et al. | |
| 2009/0090555 A1 | 4/2009 | Boone et al. | |
| 2009/0250264 A1* | 10/2009 | Dupriest .................. | E21B 7/00 175/40 |
| 2010/0032165 A1 | 2/2010 | Bailey et al. | |
| 2010/0088076 A1 | 4/2010 | Koutsabeloulis et al. | |
| 2010/0191516 A1 | 7/2010 | Benish et al. | |
| 2010/0193190 A1* | 8/2010 | Blount .................... | E21B 43/04 166/285 |
| 2010/0299111 A1 | 11/2010 | Dale et al. | |
| 2011/0011595 A1 | 1/2011 | Huang et al. | |
| 2011/0036571 A1* | 2/2011 | Vitalievich ............ | E21B 43/267 166/280.1 |
| 2011/0162848 A1 | 7/2011 | Duffy et al. | |
| 2011/0168391 A1 | 7/2011 | Saleri et al. | |
| 2011/0172976 A1 | 7/2011 | Budiman et al. | |
| 2011/0214882 A1 | 9/2011 | Santos | |
| 2012/0039668 A1* | 2/2012 | Park .................... | E21B 41/0057 405/53 |
| 2012/0067567 A1 | 3/2012 | Rytlewski et al. | |
| 2012/0152523 A1 | 6/2012 | Hofman et al. | |
| 2013/0032349 A1* | 2/2013 | Alekseenko ............ | E21B 43/26 166/308.1 |
| 2013/0032401 A1 | 2/2013 | Edbury et al. | |
| 2013/0048307 A1 | 2/2013 | Patel | |
| 2013/0105221 A1 | 5/2013 | Wassell | |
| 2013/0126158 A1* | 5/2013 | Gupta .................... | E21B 47/00 166/250.12 |
| 2013/0133876 A1* | 5/2013 | Naedler .................. | E21B 43/16 166/101 |
| 2013/0140031 A1 | 6/2013 | Cohen et al. | |
| 2013/0161096 A1 | 6/2013 | Benson et al. | |
| 2013/0186688 A1 | 7/2013 | Rasmus et al. | |
| 2013/0206475 A1* | 8/2013 | Prioul .................... | E21B 43/119 175/2 |
| 2013/0317798 A1 | 11/2013 | Cheng et al. | |
| 2014/0277752 A1* | 9/2014 | Chang .................... | E21B 44/00 700/275 |
| 2015/0276978 A1* | 10/2015 | Dupuy .................. | E21B 43/119 702/11 |

OTHER PUBLICATIONS

Bevilacqua et al., "Acquisition, Processing and Evaluation of Down Hole Data for Monitoring Efficiency of Drilling Processes," Apr. 2013, Journal of Petroleum Science Research, vol. 2, Issue 2, pp. 49-56.

Caicedo et al., "Unique Bit Performance Predictor using Specific Energy Coefficients as a Function of Confined Compressive Strength Impacts Drilling Performance," © 2005 World Petroleum Congress, 26 pages.

Ejofodomi et al., "Integrating All Available Data to Improve Production in the Marcellus Shale," © 2011 Society of Petroleum Engineers, pp. 1-37.

Flores et al., "Stimulation of Geothermal Wells, Can We Afford It?", Proceedings of World Geothermal Congress, 2005, 8 pages.

Kelessidis, "Rock Drillability Prediction From In Situ Determined Unconfined Compressive Strength of Rock," Jun. 2011, The Journal of the Southern African Institute of Mining and Metallurgy, vol. 111, pp. 429-436.

Kline, B. "Advanced Drilling and Completion", 19th World Petroleum Congress, Spain 2008, 8 pages.

Kok et al., "The Significance of Accurate Well Placement in the Shale Gas Plays," © 2010 Society of Petroleum Engineers, pp. 1-7.

MacDonald et al., "A Multi-Domain Approach to Completion and Stimulation Design in the Marcellus Shale," © 2013 Unconventional Resources Technology Conference, pp. 1-10.

Miller et al., "Evaluation of Production Log Data from Horizontal Wells Drilled in Organic Shales," © 2011 Society of Petroleum Engineers, pp. 1-23.

Mohan et al., "Tracking Drilling Efficiency Using Hydro-Mechanical Specific Energy," © 2009 SPE/IADC Drilling Conference and Exhibition, pp. 1-12.

International Search Report & Written Opinion for PCT/US2015/036190 dated Oct. 14, 2015, 10 pgs.

PCT/US2015/036190; Written Opinion, dated Jul. 18, 2016, 7 pgs.

PCT/US2015/036190; Transmittal of International Preliminary Report on Patentability; dated Oct. 27, 2016, 20 pgs.

PCT/US2015/036190; Corrected International Preliminary Report on Patentability; dated Jan. 13, 2017, 21 pgs.

Newman et al., "How Integrated Well Planning, Technology and Operations Excellence Impact Exxon Mobil's Development Well Results", SPE/IADC Drilling Conference, 2005, 6 pages.

Nguyen et al., "An Integrated Approach Using Geomechanics . . . to Optimize Reservoir Productivity and Stimulation Design", Society of Petroleum Engineers, 2014, 7 pages.

Schlumberger article, "Completions Optimized with Integrated Geomechanical Approach", © 2011, 2 pages.

Schlumberger article, "Engineered Completions Improve Eagle Ford Perforation Efficiency 28%", © 2013, 2 pages.

Schlumberger article, "Mangrove, Resevoir-centric Stimulation Design Software", © 2013, 2 pages.

Schlumberger article, "Mangrove Design Software Increases Total Stimulated Volume 25% in Marcellus Shale", © 2012, 2 pages.

Schlumberger article, "Most Productive Zones of Niobrara Formation Targeted After Expert Log and Real-Time Data Interpretation", © 2013, 2 pages.

Schlumberger article, "PDC Mountaineer Improved Production more than 50% with Optimized Completion Designs", © 2014, 2 pages.

Schlumberger article, "PetroChina Changqing Increases Initial Well Production Three-Fold in the Ordos Basin", © 2012, 2 pages.

Teale, "The Concept of Specific Energy in Rock Drilling", 1965, Int. J. Rock Mech. Mining Sci., vol. 2, pp. 57-73.

Waters et al., "Use of Horizontal Well Image Tools to Optimize Barnett Shale Reservoir Exploitation", © 2006 Society of Petroleum Engineers, pp. 1-13.

Wutherich et al., "Evaluating an Engineered Completion Design in the Marcellus Shale Using Microseismic Monitoring", © 2012 Society of Petroleum Engineers, pp. 1-10.

* cited by examiner

FIGURE 1

| Color Index Reference |||
|---|---|---|
| Color | Hardness | MSE |
| Yellow | HD1 | 0 - 15K |
| Orange | HD2 | 15K - 30K |
| Red | HD3 | 30K - 50K |
| Dark Blue | HD4 | 50K - 75K |
| Purple | HD5 | 75K - 100K |
| Light Blue | HD6 | 100K - 125K |
| Plum | HD7 | 125K - 150K |
| Magenta | HD8 | 150K - 175K |
| Sea Green | HD9 | 175K - 200K |
| Dark Green | HD10 | 200K - 225K |
| Light Purple | HD11 | 225K - 250K |
| Teal | HD12 | 250K - 300K |
| Pink | HD13 | 300K - 400K |
| Dark Purple | HD14 | 400K - 500K |

Rock Hardness Increases ↓

| Stage | Plug Depth (feet) | Cluster | | | | |
|---|---|---|---|---|---|---|
| | | 1 | 2 | 3 | 4 | 5 |
| 1 | | 15783 Orange (HD2) | 15734 Orange (HD2) | 15685 Red (HD3) | 15636 Dark Blue (HD4) | 15587 Red (HD3) |
| 2 | 15563 | 15539 Yellow (HD1) | 15490 Orange (HD2) | 15441 Red (HD3) | 15392 Red (HD3) | 15343 Yellow (HD1) |
| 3 | 15319 | 15295 Red (HD3) | 15246 Orange (HD2) | 15197 Orange (HD2) | 15148 Red (HD3) | 15099 Dark Blue (HD4) |
| 4 | 15075 | 15051 Red (HD3) | 15002 Red (HD3) | 14953 Yellow (HD1) | 14904 Dark Blue (HD4) | 14855 Dark Blue (HD4) |
| 5 | 14831 | 14807 Orange (HD2) | 14758 Red (HD3) | 14709 Red (HD3) | 14660 Dark Blue (HD4) | 14611 Red (HD3) |
| 6 | 14587 | 14563 Red (HD3) | 14514 Red (HD3) | 14465 Dark Blue (HD4) | 14416 Red (HD3) | 14367 Dark Blue (HD4) |
| 7 | 14343 | 14319 Dark Blue (HD4) | 14270 Red (HD3) | 14221 Red (HD3) | 14172 Dark Blue (HD4) | 14123 Red (HD3) |
| 8 | 14099 | 14075 Orange (HD2) | 14026 Red (HD3) | 13977 Red (HD3) | 13928 Purple (HD5) | 13879 Dark Blue (HD4) |
| 9 | 13855 | 13831 Red (HD3) | 13782 Dark Blue (HD4) | 13733 Red (HD3) | 13684 Red (HD3) | 13635 Dark Blue (HD4) |
| 10 | 13611 | 13587 Red (HD3) | 13538 Dark Blue (HD4) | 13489 Dark Blue (HD4) | 13440 Dark Blue (HD4) | 13391 Dark Blue (HD4) |
| 11 | 13367 | 13343 Red (HD3) | 13294 Red (HD3) | 13245 Yellow (HD1) | 13196 Purple (HD5) | 13147 Dark Blue (HD4) |
| 12 | 13123 | 13099 Dark Blue (HD4) | 13050 Purple (HD5) | 13001 Dark Blue (HD4) | 12952 Dark Blue (HD4) | 12903 Dark Blue (HD4) |
| 13 | 12879 | 12855 Red (HD3) | 12806 Red (HD3) | 12757 Red (HD3) | 12708 Red (HD3) | 12659 Red (HD3) |
| 14 | 12635 | 12611 Red (HD3) | 12562 Red (HD3) | 12513 Red (HD3) | 12464 Red (HD3) | 12415 Red (HD3) |
| 15 | 12391 | 12367 Red (HD3) | 12318 Red (HD3) | 12269 Dark Blue (HD4) | 12220 Red (HD3) | 12171 Dark Blue (HD4) |
| 16 | 12147 | 12123 Red (HD3) | 12074 Dark Blue (HD4) | 12025 Red (HD3) | 11976 Red (HD3) | 11927 Red (HD3) |
| 17 | 11903 | 11879 Red (HD3) | 11830 Orange (HD2) | 11781 Red (HD3) | 11732 Dark Blue (HD4) | 11683 Red (HD3) |
| 18 | 11659 | 11635 Red (HD3) | 11586 Yellow (HD1) | 11537 Red (HD3) | 11488 Yellow (HD1) | 11439 Red (HD3) |
| 19 | 11415 | 11391 Red (HD3) | 11342 Yellow (HD1) | 11293 Red (HD3) | 11244 Yellow (HD1) | 11195 Red (HD3) |
| 20 | 11171 | 11147 Yellow (HD1) | 11098 Yellow (HD1) | 11049 Yellow (HD1) | 11000 Yellow (HD1) | 10951 Yellow (HD1) |

FIGURE 4

| Stage | Plug Depth (feet) | Cluster | | | | |
|---|---|---|---|---|---|---|
| | | 1 | 2 | 3 | 4 | 5 |
| 1 | ✕ | 15783 Orange (HD2) | 15734 Orange (HD2) | 15685 Red (HD3) | 15630 Red (HD3) | 15887 Red (HD3) |
| 2 | 15563 | 15544 Red (HD3) | 15508 Red (HD3) | 15441 Red (HD3) | 15392 Red (HD3) | 15350 Red (HD3) |
| 3 | 15319 | 15295 Red (HD3) | 15246 Orange (HD2) | 15205 Red (HD3) | 15148 Red (HD3) | 15108 Red (HD3) |
| 4 | 15075 | 15051 Red (HD3) | 15002 Red (HD3) | 14957 Red (HD3) | 14900 Red (HD3) | 14866 Red (HD3) |
| 5 | 14831 | 14802 Red (HD3) | 14758 Red (HD3) | 14709 Red (HD3) | 14660 Dark Blue (HD4) | 14611 Red (HD3) |
| 6 | 14587 | 14563 Red (HD3) | 14514 Red (HD3) | 14460 Red (HD3) | 14416 Red (HD3) | 14367 Dark Blue (HD4) |
| 7 | 14343 | 14323 Red (HD3) | 14270 Red (HD3) | 14221 Red (HD3) | 14179 Red (HD3) | 14123 Red (HD3) |
| 8 | 14099 | 14075 Orange (HD2) | 14026 Red (HD3) | 13977 Red (HD3) | 13920 Dark Blue (HD4) | 13879 Dark Blue (HD4) |
| 9 | 13855 | 13831 Red (HD3) | 13782 Dark Blue (HD4) | 13738 Dark Blue (HD4) | 13696 Dark Blue (HD4) | 13635 Dark Blue (HD4) |
| 10 | 13611 | 13575 Dark Blue (HD4) | 13538 Dark Blue (HD4) | 13489 Dark Blue (HD4) | 13440 Dark Blue (HD4) | 13391 Dark Blue (HD4) |
| 11 | 13367 | 13341 Red (HD3) | 13294 Red (HD3) | 13234 Red (HD3) | 13198 Dark Blue (HD4) | 13152 Red (HD3) |
| 12 | 13123 | 13099 Dark Blue (HD4) | 13046 Dark Blue (HD4) | 13001 Dark Blue (HD4) | 12952 Dark Blue (HD4) | 12903 Dark Blue (HD4) |
| 13 | 12879 | 12855 Red (HD3) | 12806 Red (HD3) | 12757 Red (HD3) | 12708 Red (HD3) | 12659 Red (HD3) |
| 14 | 12635 | 12611 Red (HD3) | 12562 Red (HD3) | 12513 Red (HD3) | 12464 Red (HD3) | 12415 Red (HD3) |
| 15 | 12391 | 12367 Red (HD3) | 12318 Red (HD3) | 12275 Red (HD3) | 12220 Red (HD3) | 12162 Red (HD3) |
| 16 | 12147 | 12123 Red (HD3) | 12078 Red (HD3) | 12025 Red (HD3) | 11976 Red (HD3) | 11927 Red (HD3) |
| 17 | 11903 | 11879 Red (HD3) | 11823 Red (HD3) | 11781 Red (HD3) | 11740 Red (HD3) | 11683 Red (HD3) |
| 18 | 11659 | 11635 Red (HD3) | 11586 Yellow (HD1) | 11537 Red (HD3) | 11480 Red (HD3) | 11439 Red (HD3) |
| 19 | 11415 | 11391 Red (HD3) | 11342 Yellow (HD1) | 11293 Red (HD3) | 11240 Red (HD3) | 11195 Red (HD3) |
| 20 | 11171 | 11147 Yellow (HD1) | 11098 Yellow (HD1) | 11049 Yellow (HD1) | 11000 Yellow (HD1) | 10951 Yellow (HD1) |

WELL COMPLETION SYSTEM AND METHOD

CROSS REFERENCE TO RELATED APPLICATIONS

This Application is the National Stage of PCT International Patent Application PCT/US2015/040919, filed on Jul. 17, 2015, which in turn, claims the benefit of U.S. Provisional Application No. 62/127,199, filed Mar. 2, 2015, the disclosures of which are which incorporated herein by reference in their entirety.

BACKGROUND OF THE INVENTION

Field of the Invention

The present disclosure relates to methods and systems for completing a well.

Description of Related Art

Typically, horizontal well completion strategies assume homogenous and isotropic conditions throughout the lateral section of the borehole. However, such assumptions can have a high degree of error because facies of a geological formation can differ significantly throughout the lateral section of the borehole.

Accordingly, there remains a need in the art for an improved well completion system and method that is capable of characterizing a reservoir, determining a well-completion scenario, and completing the well. It would also be advantageous to develop a method for determining a well-completion scenario for at least a portion of a well that causes little or no delay between the drilling and completion phases of the well. It would be further beneficial for such a method to deliver higher efficiencies relative to wells completed on the assumption that the geological formation throughout the lateral section of the borehole is homogeneous and isotropic.

BRIEF SUMMARY OF THE INVENTION

The present disclosure is directed to well completion systems and related methods. In an aspect, the disclosure provides a well completion method that includes determining a well completion scenario based on the location of facies of a geological formation traversed by a borehole as determined by a mapping of mechanical specific energy (MSE) values of the geological formation traversed by the borehole, and perforating the well based on the well completion scenario. Among the many different possibilities contemplated, the mapping of MSE values permits the well completion method to identify the facies of the geological formation possessing similar rock strength within a given portion of the borehole. It is further contemplated that the well completion scenario can include determining the location of at least one perforation, determining a hydraulic fracturing fluid initiation pressure of the borehole, and/or positioning at least one perforation cluster at a length and/or a depth point having the same or substantially similar MSE values. It is still further contemplated that at least one fracture plug can be positioned in the borehole so as to isolate at least one section of the borehole including facies having the same or substantially similar MSEs. It is still further contemplated that a fracturing fluid and/or proppant can be selected based on the location of facies, and used in a hydraulic fracturing process to fracture the well.

In another aspect, the disclosure provides a well completion method that includes determining a well completion scenario based on a the location of facies of a geological formation traversed by a borehole as determined by a mapping of mechanical specific energy (MSE) values of the geological formation traversed by the borehole, and fracturing the borehole using at least one fracturing sleeve. The well completion scenario is used to position the fracturing sleeve for hydraulic fracturing of the borehole. Among the many different possibilities contemplated, the mapping of MSE values permits the well completion method to identify the facies of the geological formation possessing similar rock strength within a given portion of the borehole. It is further contemplated that a fracturing fluid and/or proppant can be selected based on the location of facies, and used in a hydraulic fracturing process to fracture the well. It is still further contemplated that the well completion scenario can include selecting a location to place a port of the fracturing sleeve and/or positioning at least one perforation cluster at a length and/or a depth point with the same or substantially similar MSE values.

In another aspect, the disclosure provides a well completion method that includes determining a well completion scenario based on a the location of facies of a geological formation traversed by a borehole as determined by a mapping of mechanical specific energy (MSE) values of the geological formation traversed by the borehole, and completing or recompleting a well based on the well completion scenario. Among the many different possibilities contemplated, the mapping of MSE values permits the well completion method to identify the facies of the geological formation possessing similar rock strength within a given portion of the borehole. It is further contemplated that the well may be recompleted in a manner different than that utilized in the initial completion of the borehole. The well may be completed or recompleted by perforating and/or hydraulic fracturing the borehole. It is still further contemplated that the well completion scenario can include positioning at least one fracture plug in the borehole so as to isolate at least one section of the borehole comprising facies having the same or substantially similar MSE values.

The above brief summary presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented below.

Additionally, the above brief summary has outlined rather broadly the features and technical advantages of the present invention in order that the detailed description of the invention that follows may be understood. Additional features and advantages of the invention will be described hereinafter, which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings illustrate preferred embodiments. However, it is to be understood that these embodiments are not intended to be exhaustive, nor limiting of the invention. These embodiments are but examples of some of the forms in which the invention may be practiced. Like reference numbers or symbols employed across the several figures are employed to refer to like parts or components illustrated therein.

FIG. 4 illustrates an example of a geometric design of a well completion scenario in accordance with an embodiment of the invention.

FIG. 5 illustrates an example of an engineered design of a well completion scenario that is determined based on the location of facies of a geological formation traversed by a borehole, in accordance with an embodiment of the invention.

DETAILED DESCRIPTION OF THE INVENTION

Figure 1:
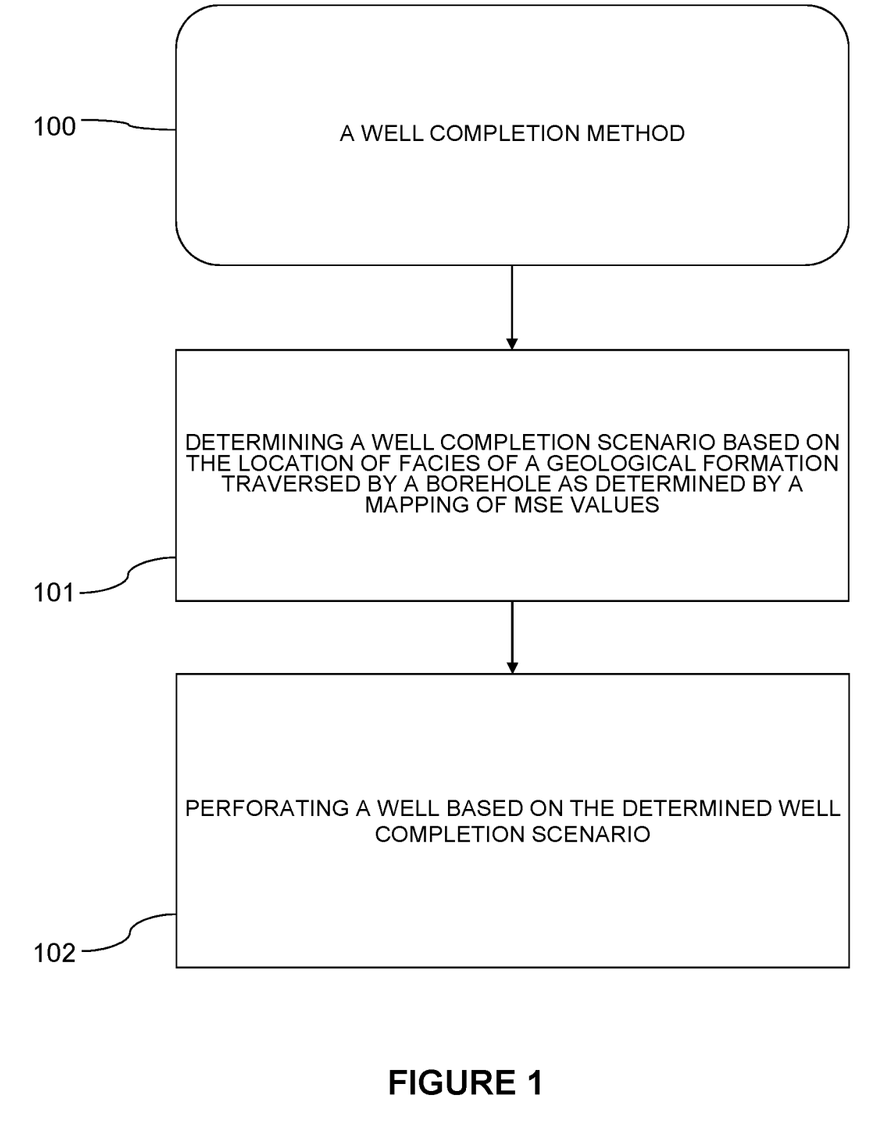
FIG. 1 illustrates a flowchart summarizing a well completion method in accordance with an embodiment of the invention.

Without any intent to limit the scope of this invention, reference is made to the figures in describing various embodiments of the invention. At 100, FIG. 1 depicts a flow chart illustrative of a well completion method in accordance with an embodiment of the invention. At 101, the well completion method comprises determining a well completion scenario based on the location of facies of a geological formation traversed by a borehole as determined by a mapping of mechanical specific energy (MSE) values of the geological formation traversed by the borehole. The well completion scenario may include oil and gas well processes including, but not limited to, perforating, hydraulic fracturing or refracturing ("fracking"), and/or acidizing.

The MSE value of a particular facies within a geological formation is defined typically as the amount of energy required per unit volume of rock drilled, and can be calculated using drilling data that is recorded during the drilling of a well. Drilling data includes, but is not limited to, information such as torque, RPM, hole diameter, ROP, and WOB. If a mud motor is used to drill the borehole, additional data can be recorded such as the speed-to-flow ratio, and differential pressure. For example, in co-pending and co-owned U.S. Provisional Application No. 62/026,199, filed Jul. 18, 2014, by William D. Logan and Sridhar Srinivasan, which is hereby incorporated by reference in its entirety, a method for analyzing drilling data to calculate MSE for a geological formation traversed by a borehole is disclosed.

In an aspect of the invention, the MSE values are calculated using the calculation method adopted by Pason Systems Corporation for use with its Electronic Drilling Recorder because it has been found to calculate the MSE more accurately than other methods. The calculation method used by Pason is disclosed in Pason Systems Corporation, MSE: A Valuable Trending Tool for Drillers and Engineers, PRODUCT APPLICATION NOTE, (retrieved on Feb. 27, 2015), available at http://pasonusa.com/images/stories/PANs/MSE/docu180_en_mse_product_application_note.pdf.

The MSE calculation used by Pason provides that the absolute MSE can be calculated when the torque is calibrated and a mud motor is not in use with the following formula:

$$MSE = \frac{4 \cdot WOB}{\pi D^2} + \frac{480}{D^2} \cdot \frac{N \cdot T}{ROP} \quad \text{(Equation 1)}$$

The MSE calculation further provides that the MSE can be calculated provides when a mud motor is in use using the following formula:

$$MSE[\text{ksi}] = \frac{4 \cdot WOB}{\pi D^2} + \frac{480}{D^2} \cdot \frac{(N + K_N \cdot Q) \cdot ((T_{MAX}/\Delta P_{MAX}) \cdot \Delta P/1000)}{ROP} \quad \text{(Equation 2)}$$

The definitions and units associated with the variables or drilling data in the formulae above are shown below in Table 1.

TABLE 1

| Variable | Definition | US |
|---|---|---|
| MSE | Mechanical specific energy | ksi |
| WOB | Weight on bit | klbs |
| D | Bit diameter | inches |
| N | Rotary speed | RPM |
| T | Rotary torque (units may be different) | kFT-lb |
| ROP | Rate of penetration | ft/hr |
| $K_N$ | Mud motor speed to flow ratio | rev/gal |
| Q | Total mud flow rate | gal/min |
| $T_{MAX}$ | Mud motor maximum-rated torque | ft-lb |
| $P_{MAX}$ | Mud motor maximum-rated differential pressure | psi |
| P | Differential pressure | psi |

Although in some aspects of the invention the foregoing calculation method is preferred, it should be appreciated that other calculation methods can be used that are capable of calculating or reasonably approximating the MSE. Such methods include, but are not limited to, the Teale definition, which is disclosed in an article entitled "The Concept Of Specific Energy In Rock Drilling" [Int'l J. Rock Mech. Mining Sci. (1965) 2, 5773]. The Teale definition uses drilling data such as weight-on-bit (WOB), rig rotary speed in RPM's, torque at the bit, rate of penetration (ROP), and an area (i.e., borehole (or bit) cross-sectional area).

In this disclosure, it has now been found that the MSE is closely related to the Uniaxial Compress Strength (UCS) or rock strength of the geological rock formation. Variation in the UCS is typically an indication of reservoir heterogeneity and change in facies. While MSE and UCS need not be necessarily equal, they typically follow similar trends. Thus, by calculating the MSE, the UCS of the geological rock formation can be approximated, which permits estimation and/or mapping of the reservoir heterogeneity and change in facies of the geological formation traversed by the borehole. In this manner, facies of the geological formation possessing similar rock strength can be identified within a given portion of the borehole.

At 101, the well completion scenario is determined based on the location of facies of a geological formation traversed by the borehole as determined by the mapping of the (MSE) values of the geological formation traversed by the borehole. Once the MSE values are mapped, the well completion scenario can be developed, which permits optimization of perforation placement. At 102, the well is perforated based on the well completion scenario. The well can be subsequently fractured in accordance with the well completion scenario.

Figure 2:
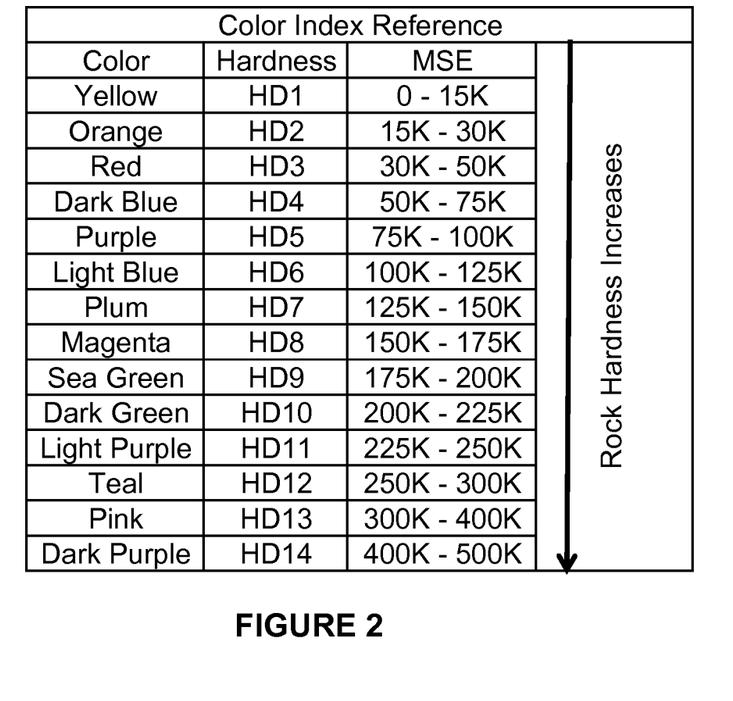
FIG. 2 illustrates a grouping of the same or substantially similar facies of a geological formation grouped together by MSE and/or hardness ranges.
Figure 3:
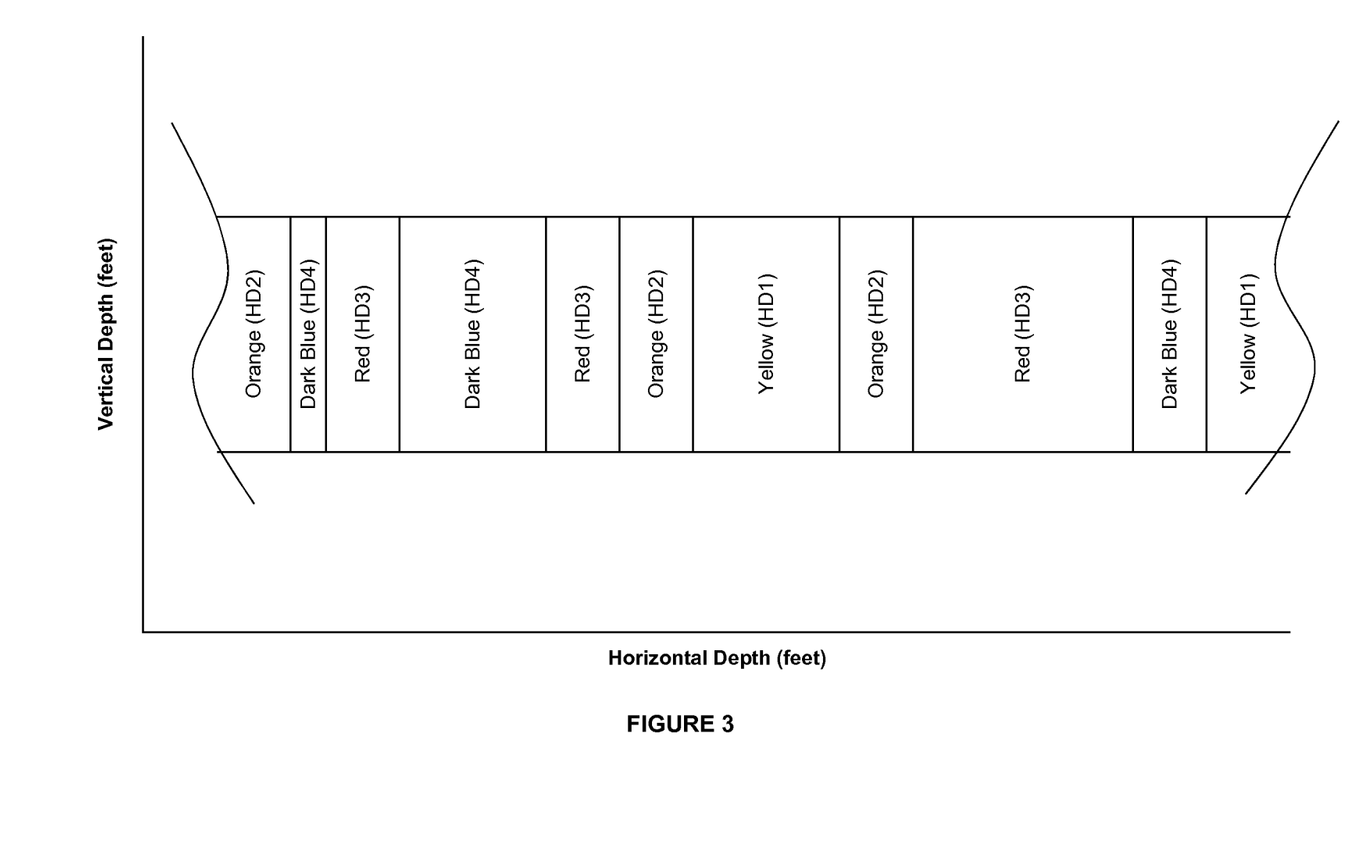
FIG. 3 illustrates a plot or mapping of the MSE of a geological formation traversed by the borehole.

The mapping of the MSE values preferably includes the facies of the geological formation per unit depth and/or length. The same or substantially similar facies of the geological formation can be grouped together by predetermined MSE and/or hardness ranges as shown in FIG. 2. The MSE and/or hardness ranges can then be plotted per unit depth, which depicts the reservoir heterogeneity and change in the facies or Ethology of the geological formation traversed by the borehole. For example, as shown in FIG. 3, the MSE ranges are plotted per unit depth and length. The mapping of mechanical specific energy (MSE) values is then used to select a well completion scenario that is matched to at least one location in the borehole. In this manner, the well completion method permits determination of the location of at least one perforation in the well completion scenario.

In a typical geometric design, the perforations are located at the same or substantially similar predefined intervals along the borehole. For example, FIG. 4 depicts such a geometric design with a predefined interval of about 244 feet. However, such a design often produces a well completion scenario that has a substantial degree of variability of the facies at the perforation clusters. Such variability can lead to an ineffective well completion because the geological formation will not fracture at the same or substantially similar fluid initiation pressure at most of the selected perforation cluster locations.

On the other hand, if an engineered design is used that determines the well completion scenario based on the location of facies of the geological formation traversed by the borehole, then the perforations can be located within the geological formation at locations along the borehole having the same or substantially similar facies. For example, as shown in FIG. 5, the engineered design produces a well completion scenario that has a far lower degree of variability of the facies at the perforation clusters, which leads to more effective and efficient well completion because the geological formation should fracture at the same or substantially similar fluid initiation pressure at most if not all of the selected perforation cluster locations. Thus, the engineered design can provide a more uniform, more productive fracture while at the same time improving the efficiency of the fracturing process as compared to a typical geometric design.

It should be appreciated that the drilling data can contain errors due to irregularities such as measurement inaccuracies and related artifacts that are unrelated to properties of the geological formation traversed by the borehole. The MSE calculation can become inaccurate if the drilling data contains such errors. Therefore, in one aspect, in order to ensure the MSE is accurately calculated, the drilling data is cleaned to remove any errors in the drilling data prior to using the drilling data as algorithmic variable input(s) to calculate the MSE. For example, data may be recorded for drilling the same section at different times. Such a situation can occur when the rock comprising a section is drilled at a first time, a plug of cement is placed in the well and the cement comprising the section is drilled through at a second time. Other inaccuracies can include removing negative differential pressure data, which is generally considered an impossible condition.

In another aspect, the engineered design can be compared with at least one alternate data set to further calibrate the engineered design. For example, during a drilling operation of a well a wide array of information is often collected and recorded. Such information may include information that does not include variables of the MSE calculation described herein, but the information may correlate to UCS or may be assumed to correlate to UCS. Thus, some of the information that does not include variables of the MSE calculation may be used to calibrate values of MSE variables to yield MSE values which better represent the variation of rock strength along a trajectory of a well. Accordingly, the alternate data set may include information including, but not limited to, one or more of production log data, core mechanical properties, whole core data, log analysis, tracer logs, sonic mechanical properties, image log data, mud log data, gamma ray data, and so forth.

In another aspect, the well completion method can include using drilling data as algorithmic variable input(s) to evaluate at least one property of at least one geological formation traversed by a borehole. The at least one property can be the MSE, which can be calculated as discussed herein. Thus, where the at least one property is MSE, the algorithmic variable input(s) can include drilling data corresponding to variables of MSE, which include MSE variables described herein. The well completion scenario can then be determined based on the property of the geological formation traversed by the borehole. For example, where the algorithmic variable input(s) are used to determine the MSE, the MSE values of the geological formation traversed by the borehole can be mapped to determine the location of facies of the formation, which can then be used to develop a well completion scenario. The well is perforated based on the well completion scenario, and can also be fractured based on the well completion scenario.

In another aspect, the well completion method can include determining the facies of the geological formation traversed by the borehole using the at least one property, which can be used to generate a first model of at least one facies of the geological formation traversed by the borehole. The first model preferably includes the facies of the geological formation per unit depth. Ranges of the MSE can be correlated to the facies of the geological formation as shown in FIG. 2. The same or substantially similar facies of the geological formation are grouped together, which are then used to select a well completion scenario that is matched to at least one location in the borehole. In this manner, the well completion scenario includes a determination of the location of at least one perforation. That is, perforation clusters can be positioned at one or more length and/or depth point with the same or substantially similar facies. The well can be perforated, and hydraulically fractured.

In another aspect, the well completion method can include optimizing various perforation parameters associated with perforating a well. The perforation parameters can be optimized using the location of facies as determined by the mapping of mechanical specific energy (MSE) values of the geological formation traversed by the borehole. Examples of perforation parameters include, but are not limited to, the number of perforations per perforation cluster, the number of perforation clusters in a given stage of the well, the spacing of perforation clusters, the perforation charge type, and so forth. For example, more perforations per perforation cluster can be used in facies having higher MSE values. In facies with lower MSE values, fewer perforations per perforation cluster can be used. In a further example, more perforations per cluster can be used at a given stage or section of a well that is relatively homogenous, i.e., having the same or substantially similar MSE values. In a section of a well that is relatively heterogeneous (i.e., having varying MSE values), less perforations can be used at a given stage or section. In still a further example, in a section of a well that is relatively homogenous, the perforation clusters can be densely located or spaced in a given section or stage of the well. On the other hand, in a section of a well that is relatively heterogeneous, the perforation clusters can be more less densely located or spaced in a given section or stage of the well.

In another aspect, the well completion scenario can include determining a fluid initiation pressure of the borehole. For example, by grouping the same or substantially similar facies of the geological formation together, an optimum fluid initiation pressure can be determined. The fluid initiation pressure is typically understood as the fluid pressure within the borehole resulting in the initiation of a tensile crack in a defect free or substantially defect free subsurface material.

In another aspect, the well completion scenario can include determining placement of at least one fracturing sleeve, such as a sliding fracturing sleeve, at a location within the geological formation traversed by a borehole. A suitable example of a fracturing sleeve includes, but is not limited to, those described in U.S. Patent Application Publication No. 2013/0161017 A1, filed on Jun. 27, 2013.

In another aspect, the well completion scenario can include selecting the location (e.g, a depth and/or a length point along the geological formation traversed by the borehole) to place a port of the fracturing sleeve based on the facies of the geological formation traversed by the borehole. For example, the facies of the geological formation traversed by the borehole can be determined, the casing with one or more ports at one or more preselected depths can be run, then the well (with or without supplemental perforation) can be fractured.

It should be appreciated that the first model can be used to select appropriate fracture plug designs based upon modeled fracture initiation pressures which will differ among facies with different MSEs, fracture plug placement to allow for clustering of similar facies for perforation and/or fracturing, fluid initiation pressure, and so forth. For example, the first model can be used with existing software suites such as FRACPRO™ available from CARBO Ceramics Inc. of Houston, Tex.

In another aspect, the method can include optimizing one or more fracturing parameters based on the mapping of MSE values of the facies. For example, the pump rate (e.g., gallons per minute) of the fracturing fluid during the hydraulic fracturing process can be optimized based on the MSE values of facies for a particular section or stage of the well. Higher pump rates can be used for facies having higher MSE values. Similarly, lower pump rates can be used for facies having lower MSE values. the method can further include selecting a hydraulic fracturing fluid based on the MSE values of the facies, which as discussed above generally correlates to the rock strength of facies, and using the hydraulic fracturing fluid in the hydraulic fracturing process. In addition, one or more fracturing fluid parameters can also be optimized based on the mapping of MSE values of the facies. Examples of fracturing fluid parameters include, but are not limited to, fracturing fluid type, viscosity, rheology, pumping rate of fracturing fluid and so forth. For example, it has been found that lower viscosity fluids generally perform better with facies having higher MSE values while higher viscosity fluids typically perform better with facies having lower MSE values. In addition, one or more fracturing fluid additives can also be selected and/or optimized using the location of facies as determined by the mapping of MSE values, e.g., types and volumes of polymers, breakers, acids, clay stabilizers, pH stabilizers, and so forth. For example, in general, it has been found that higher volumes of guar polymer are typically needed for facies having lower MSE values.

In another aspect, the method can include selecting a proppant based on the location of facies as determined by the mapping of MSE values, and using the proppant in a hydraulic fracturing process. One or more additional proppant parameters can also be optimized based on the mapping of MSE values of the facies. Examples of additional proppant parameters include, but are not limited to, proppant size (i.e., mesh size), proppant type (e.g., white sand, ceramic, etc.), volume of proppant, and so forth. In another aspect, the method can include determining at least one parameter of a well completion scenario or a well recompletion scenario for at least a portion of a drilled well. A well completion scenario as used herein refers to a plan proposed for at least some parts of a completion phase of a borehole. A well recompletion scenario as used herein is a term encompassed by the term well completion scenario and refers to a plan proposed for recompleting a borehole in a manner different from the manner utilized in the initial completion of the borehole. As known in the art, a well recompletion scenario includes plugging perforations in the zones initially completed in the borehole prior to forming perforations in the different zones. As such, the determination of at least one parameter of a well recompletion scenario for the methods described herein are not only based on MSE values corresponding to the portion of the well of interest, but can also be based on locations of perforation clusters created during an initial well completion of the drilled well.

Figure 6:
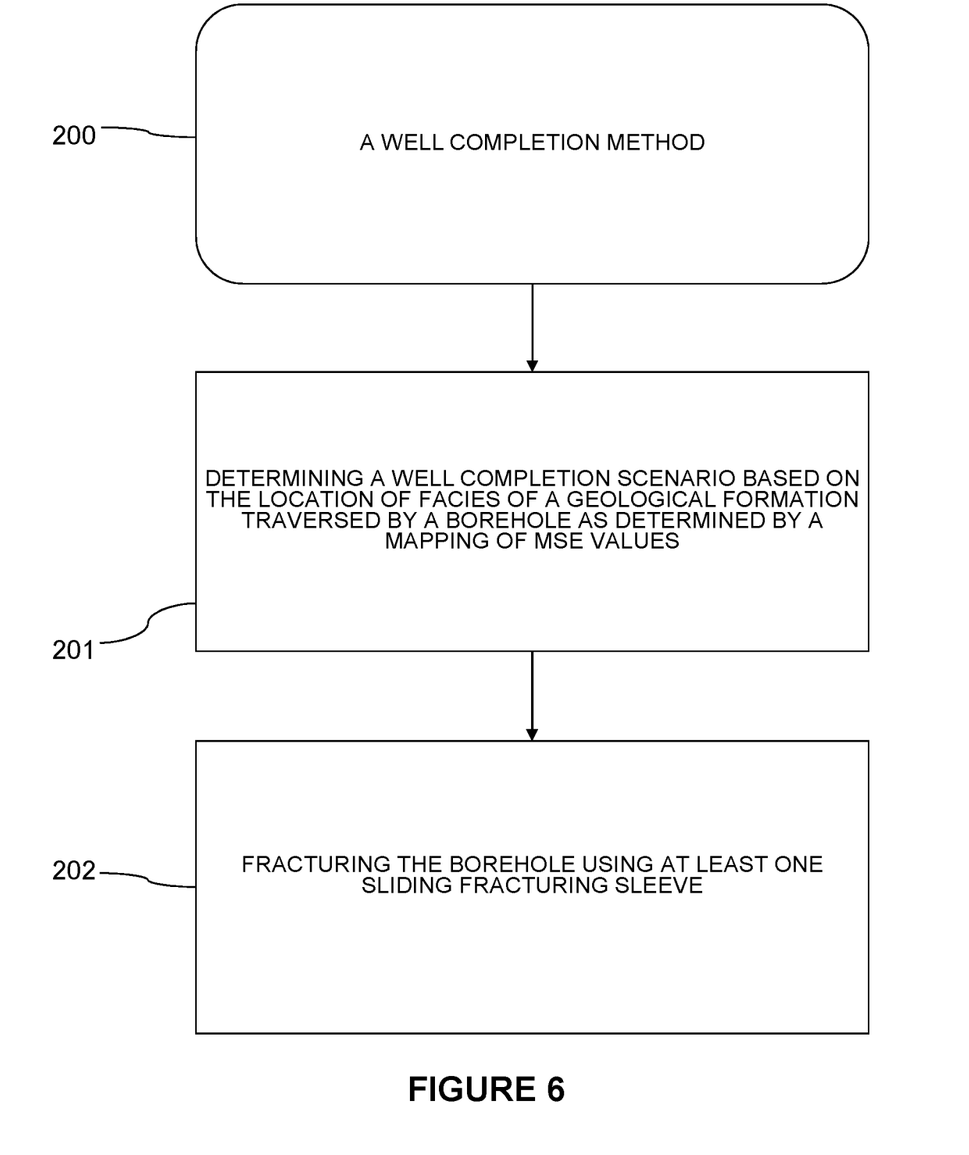
FIG. 6 a flowchart summarizing a well completion method in accordance with an embodiment of the invention.

In an embodiment, as shown in FIG. 6 at 200, a well completion method is shown that comprises determining a well completion scenario based on the location of facies of a geological formation traversed by a borehole as determined by a mapping of the MSE values of the geological formation traversed by the borehole 201. At 202, at least one fracturing sleeve is used to fracture the borehole. The well completion scenario is used to position the fracturing sleeve for hydraulic fracturing of the borehole. In a further aspect, the well completion method can also include selecting a proppant based on the MSE of the facies to be fractured, which generally correlates to the rock strength of the facies to be fractured, and using the proppant to maintain the fractures resulting from a hydraulic fracturing process. In still a further aspect, the well completion method can also include selecting a hydraulic fracturing fluid for a location of facies, and using the hydraulic fracturing fluid in the hydraulic fracturing process.

Figure 7:
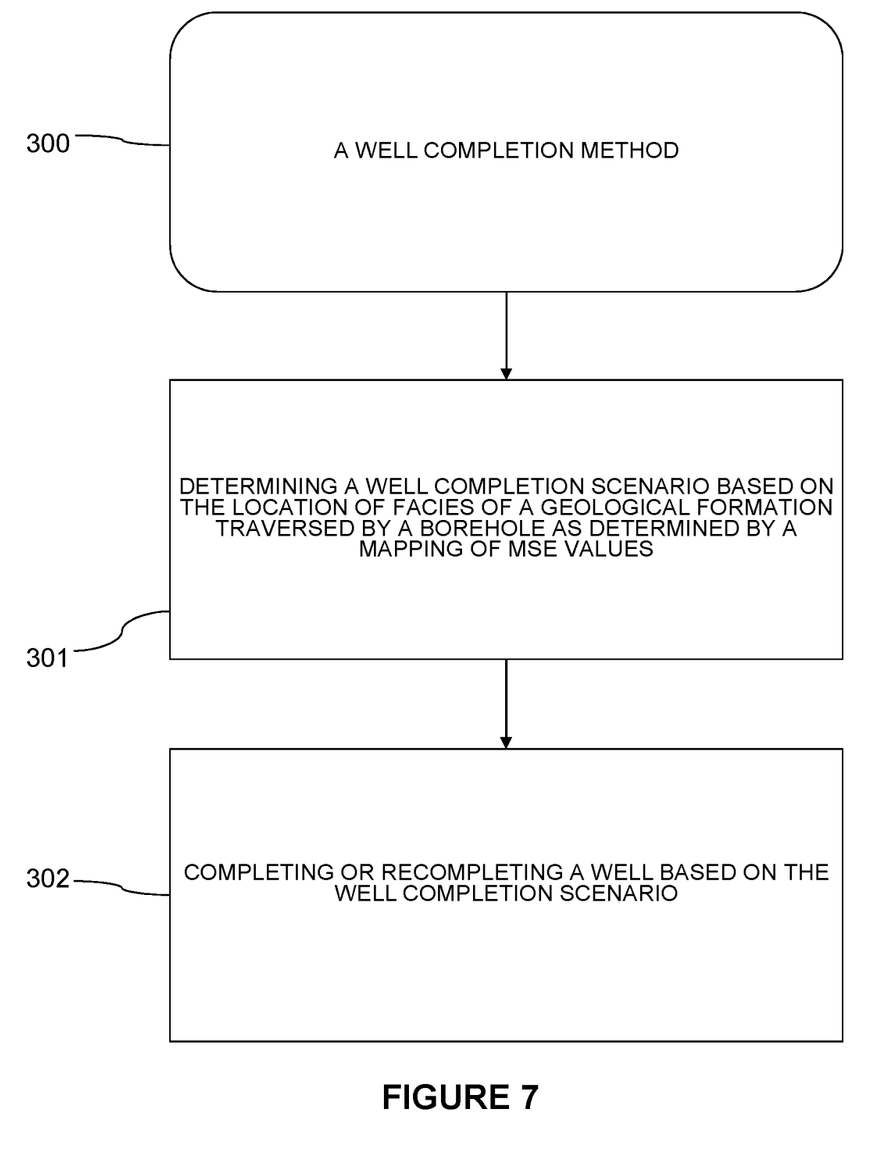
FIG. 7 a flowchart summarizing a well completion method in accordance with an embodiment of the invention.

In an embodiment, as shown in FIG. 7 at 300, a well completion method is shown that comprises determining a well completion scenario based on the location of facies of a geological formation traversed by a borehole as determined by a mapping of the MSE values of the geological formation traversed by the borehole 301. At 302, the well is completed or recompleted based on the determined well completion scenario. The mapping of MSE values permits the well completion method to identify the facies of the geological formation possessing similar rock strength within a given portion of the borehole. When the well is recompleted, it may be beneficial for the well to be recompleted in a manner different from that utilized in the initial completion of the borehole. The well may be completed or recompleted by perforating and/or hydraulic fracturing of the borehole. For example, if the well was initially completed based on a geometric design, then the well could be recompleted using the engineered design as described above. During recompletion, the mapping of MSE values can be utilized to target perforations and/or perforation clusters to facies having similar MSE values, and perforating and fracturing those areas. In this manner, the well can have better fracture propagation than the initial geometric design.

It is still further contemplated that the well completion scenario can include positioning at least one fracture plug in the borehole so as to isolate at least one section of the borehole comprising facies having the same or substantially similar MSE values. The fracture plug can also be placed to isolate areas that were previously perforated and/or fractured.

In various alternate embodiments, certain aspects of the well completion method may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks, USB drives, and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, certain aspects of the well completion method may provide a system that incorporates a variety of computer readable media encoded with one or more computer readable program code. One skilled in the art will recognize that the software associated with the various processes described herein can be embodied in a wide variety of computer accessible media from which the software is loaded and executed. Pursuant to In re Beauregard, 35 USPQ2d 1383 (U.S. Pat. No. 5,710,578), the present disclosure contemplates and includes this type of computer readable media within the scope of the invention. Pursuant to In re Nuijten, 500 F.3d 1346 (Fed. Cir. 2007) (U.S. patent application Ser. No. 09/211,928), the scope of the present disclosure is also intended to include computer readable media wherein the media is both tangible and non-transitory.

Various well completion methods have been disclosed. In an embodiment, the method uses mapped geological formation characterization data based upon mechanical specific energy (MSE) values to determine a well completion scenario and to execute the well completion scenario to perforate a geological formation traversed by a borehole. The formations surrounding the perforated well can be fractured or refractured using a hydraulic fracturing fluid under pressure and other techniques known within the art. The borehole can be perforated and hydraulically fractured after appropriately diverting the hydraulic fracturing fluid from the existing perforations and fractures. The fracture formations surrounding the well can be readied for production using well-completion techniques (e.g., proppant injection, and so forth). Hydrocarbons within the fractured formations surrounding the well then can be extracted from the well.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise. Furthermore, aspects of the invention may comprise, consist essentially of, or consist of the indicated elements or method steps.

Any reference to patents, documents and other writings contained herein shall not be construed as an admission as to their status with respect to being or not being prior art. Unless the meaning is clearly to the contrary, all ranges set forth herein are deemed to be inclusive of the endpoints. Although the present invention and its advantages have been described in detail, it is understood that the array of features and embodiments taught herein may be combined and rearranged in a large number of additional combinations not directly disclosed, as will be apparent to one having ordinary skill in the art. The invention disclosed herein may be practiced in the absence of any element which is not specifically disclosed herein. It should be understood that various changes, substitutions and alterations can be made herein without departing from the spirit and scope of the invention as defined by the following claims. There are, of course, other embodiments, which are alternatives to the foregoing descriptions of the invention, which are intended to be included within the scope of the invention, as defined by the following claims.

What is claimed is:

1. A well completion method, the method comprising:
grouping mechanical specific energy (MSE) values of a geological formation traversed by a borehole so as to form a plurality of groups based on predetermined ranges of MSE values;
determining a well completion scenario based on the location of facies of the geological formation traversed by a borehole, wherein the well completion scenario comprises positioning at least one perforation cluster within the geological formation at a location along the borehole having the same or substantially similar facies as defined by having the same or similar MSE values as determined by a mapping of the MSE values of the geological formation traversed by the borehole using the grouping of MSE values; and
perforating at least a portion of a well based on the well completion scenario.

2. The well completion method of claim 1 wherein the mapping of MSE values permits an identification of the facies of the geological formation possessing similar rock strength within a given portion of the borehole.

3. The well completion method of claim 2 wherein the well completion scenario comprises determining the location of at least one perforation.

4. The well completion method of claim 2 wherein the well completion scenario further comprises determining a hydraulic fracturing fluid initiation pressure of the facies to be perforated.

5. The well completion method of claim 3 wherein the at least one perforation cluster is positioned at a length and/or a depth point having the same or substantially similar MSE values.

6. The well completion method of claim 5 further comprising positioning at least one fracture plug in the borehole so as to isolate at least one section of the borehole comprising facies having the same or substantially similar MSE values.

7. The well completion method of claim 6 further comprising selecting a proppant based on the location of facies, and using the proppant in a hydraulic fracturing process.

8. The well completion method of claim 7 further comprising selecting a hydraulic fracturing fluid based on the location of facies, and using the hydraulic fracturing fluid in the hydraulic fracturing process.

9. A well completion method, the method comprising:
grouping mechanical specific energy (MSE) values of a geological formation traversed by a borehole so as to form a plurality of groups based on predetermined ranges of MSE values;
determining a well completion scenario based on the location of facies of the geological formation traversed by a borehole, wherein the well completion scenario comprises positioning at least one perforation cluster within the geological formation at a length and/or a depth point along the borehole with the same or substantially similar facies as defined by having the same or similar MSE values as determined by a mapping of the MSE values of the geological formation traversed by the borehole based on the grouping of MSE values; and
fracturing a portion of the borehole.

10. The well completion method of claim 9 wherein the mapping of MSE values permits an identification of the facies of the geological formation possessing similar rock strength within a given portion of the borehole.

11. The well completion method of claim 10 further comprising selecting a proppant based on the location of facies, and using the proppant used in a hydraulic fracturing process.

12. The well completion method of claim 11 further comprising selecting a hydraulic fracturing fluid based on the location of facies, and using the hydraulic fracturing fluid in the hydraulic fracturing process.

13. The well completion method of claim 10 wherein the well completion scenario further comprises selecting a location to place a port of a fracturing sleeve.

14. A well completion method comprising:
grouping mechanical specific energy (MSE) values of a geological formation traversed by a borehole so as to form a plurality of groups using predetermined ranges of MSE values;
determining a well completion scenario based on the location of facies of the geological formation traversed by the borehole, wherein the well completion scenario comprises positioning at least one perforation cluster within the geological formation at a location along the borehole with the same or substantially similar facies as defined by having the same or similar MSE values as determined by a mapping of the MSE values of the geological formation traversed by the borehole using the grouping of MSE values; and
completing or recompleting a well based on the well completion scenario.

15. The well completion method of claim 14 wherein the mapping of MSE values permits an identification of the facies of the geological formation possessing similar rock strength within a given portion of the borehole.

16. The well completion method of claim 15 wherein the well is completed or recompleted by perforating the well.

17. The well completion method of claim 15 wherein the well is completed or recompleted by fracturing or refracturing the well.

18. The well completion method of claim 17 further comprising positioning at least one fracture plug in the borehole so as to isolate at least one section of the borehole comprising facies having the same or substantially similar MSE values.

19. The well completion method of claim 15 wherein the well is recompleted based on a well recompletion scenario.

* * * * *

UNITED STATES PATENT AND TRADEMARK OFFICE
CERTIFICATE OF CORRECTION

PATENT NO. : 10,837,277 B2  
APPLICATION NO. : 15/554856  
DATED : November 17, 2020  
INVENTOR(S) : William Dale Logan Page 1 of 1

It is certified that error appears in the above-identified patent and that said Letters Patent is hereby corrected as shown below:

In the Specification

At Column 1, Line 11, reads "which are which" and should read -- which are --

Signed and Sealed this  
Fifth Day of January, 2021

Andrei Iancu  
*Director of the United States Patent and Trademark Office*